US008966003B2

(12) United States Patent
Kokal et al.

(10) Patent No.: US 8,966,003 B2
(45) Date of Patent: Feb. 24, 2015

(54) CONTENT DELIVERY NETWORK STREAM SERVER VIGNETTE DISTRIBUTION (75) Inventors: Mohan I. Kokal, Peoria, AZ (US); Eric Cadwell, Phoenix, AZ (US); Jon B. Corley, Peoria, AZ (US); Tamara Monson, Scottsdale, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 232 days.

(21) Appl. No.: 12/563,793

(22) Filed: Sep. 21, 2009

(65) Prior Publication Data
US 2010/0077056 A1 Mar. 25, 2010

Related U.S. Application Data (60) Provisional application No. 61/098,530, filed on Sep. 19, 2008.

(51) Int. Cl.
G06F 15/16 (2006.01)
H04L 29/06 (2006.01)
(Continued)

(52) U.S. Cl.
CPC ...... *H04L 65/4084* (2013.01); *H04N 21/23106* (2013.01); *H04N 21/47202* (2013.01); *H04N 21/6175* (2013.01); *H04N 21/8456* (2013.01)
USPC ........................................................ 709/217

(58) Field of Classification Search
CPC .................. H04N 21/23106; H04N 21/47202; H04L 65/4084
USPC .................................................. 709/217–219
See application file for complete search history.

(56) References Cited

U.S. PATENT DOCUMENTS 5,956,716 A 9/1999 Kenner et al.
6,112,239 A 8/2000 Kenner et al.
(Continued)

FOREIGN PATENT DOCUMENTS

JP 2002-032280 A 1/2002
KR 10-2001-0088742 A 9/2001
(Continued)

OTHER PUBLICATIONS

Carstoiu, Bogdan et al., "A New Grid Caching System Based on AMQP Protocol", IADIS International Conference WWW/Internet 2008, pp. 473-477.
(Continued)

*Primary Examiner* — Rupal Dharia
*Assistant Examiner* — Marcus McKenzie
(74) *Attorney, Agent, or Firm* — Kilpatrick Townsend & Stockton LLP (57) ABSTRACT A system and method for delivering content objects over the Internet to an end user system with a content delivery network (CDN) is disclosed. The system and method allow for dynamically storing and distributing a portion of content streams. When a content object is requested by an end user media player, the request is assigned to an edge server within the CDN. Characteristics of the content object are used to determine the portion of the content object where the portion is less than all of the requested content. The portion of content object is then retrieved from the content and is stored within the CDN. The portion of requested content is streamed to the end user media player. Ultimately, the whole content is streamed to the end user media player if the remainder of content is requested by the end user media player.

19 Claims, 9 Drawing Sheets

(51) Int. Cl.
  *H04N 21/231*  (2011.01)
  *H04N 21/472*  (2011.01)
  *H04N 21/61*   (2011.01)
  *H04N 21/845*  (2011.01)

(56) References Cited

U.S. PATENT DOCUMENTS

| | | | |
|---|---|---|---|
| 6,199,107 B1 | 3/2001 | Dujari | |
| 6,415,280 B1 | 7/2002 | Farber et al. | |
| 6,463,508 B1 | 10/2002 | Wolf et al. | |
| 6,519,646 B1 | 2/2003 | Gupta et al. | |
| 6,754,699 B2 | 6/2004 | Swildens et al. | |
| 6,785,704 B1 | 8/2004 | McCanne | |
| 6,859,840 B2* | 2/2005 | Singal et al. | 709/232 |
| 6,904,449 B1* | 6/2005 | Quinones | 709/203 |
| 6,917,960 B1 | 7/2005 | Decasper et al. | |
| 7,028,096 B1 | 4/2006 | Lee | |
| 7,096,266 B2* | 8/2006 | Lewin et al. | 709/226 |
| 7,133,905 B2 | 11/2006 | Dilley et al. | |
| 7,158,986 B1* | 1/2007 | Oliver et al. | 1/1 |
| 7,222,190 B2 | 5/2007 | Klinker et al. | |
| 7,240,100 B1 | 7/2007 | Wein et al. | |
| 7,359,955 B2* | 4/2008 | Menon et al. | 709/219 |
| 7,370,217 B2* | 5/2008 | Weast | 713/320 |
| 7,472,178 B2* | 12/2008 | Lisiecki et al. | 709/223 |
| 7,555,287 B1 | 6/2009 | Heinonen et al. | |
| 7,567,800 B2 | 7/2009 | Uematsu et al. | |
| 7,600,025 B2* | 10/2009 | Lewin et al. | 709/226 |
| 7,613,792 B2 | 11/2009 | Zervas et al. | |
| 7,752,258 B2 | 7/2010 | Lewin et al. | |
| 7,814,172 B2* | 10/2010 | Martin et al. | 709/218 |
| 7,818,355 B2* | 10/2010 | Mills et al. | 709/203 |
| 7,849,199 B2 | 12/2010 | Schulz et al. | |
| 7,860,950 B2* | 12/2010 | Menon et al. | 709/219 |
| 8,090,863 B2 | 1/2012 | Raciborski et al. | |
| 8,099,757 B2* | 1/2012 | Riedl et al. | 725/116 |
| 8,341,255 B2* | 12/2012 | Gopalakrishnan | 709/223 |
| 8,527,647 B2* | 9/2013 | Gopalakrishnan | 709/231 |
| 2001/0027493 A1* | 10/2001 | Wallace | 709/247 |
| 2001/0049732 A1* | 12/2001 | Raciborski et al. | 709/224 |
| 2001/0055302 A1 | 12/2001 | Taylor et al. | |
| 2002/0007418 A1* | 1/2002 | Hegde et al. | 709/231 |
| 2002/0052942 A1 | 5/2002 | Swildens et al. | |
| 2002/0087660 A1* | 7/2002 | Martin et al. | 709/218 |
| 2002/0091801 A1* | 7/2002 | Lewin et al. | 709/219 |
| 2002/0103928 A1* | 8/2002 | Singal et al. | 709/224 |
| 2002/0133491 A1* | 9/2002 | Sim et al. | 707/10 |
| 2002/0143888 A1* | 10/2002 | Lisiecki et al. | 709/214 |
| 2002/0152318 A1* | 10/2002 | Menon et al. | 709/231 |
| 2002/0194324 A1* | 12/2002 | Guha | 709/223 |
| 2003/0004947 A1 | 1/2003 | Coverston | |
| 2003/0046335 A1* | 3/2003 | Doyle et al. | 709/203 |
| 2003/0191812 A1* | 10/2003 | Agarwalla et al. | 709/217 |
| 2003/0195974 A1 | 10/2003 | Ronning et al. | |
| 2004/0008693 A1 | 1/2004 | Grove et al. | |
| 2004/0019497 A1 | 1/2004 | Volk et al. | |
| 2004/0073596 A1 | 4/2004 | Kloninger et al. | |
| 2004/0128343 A1 | 7/2004 | Mayer | |
| 2004/0221019 A1* | 11/2004 | Swildens et al. | 709/217 |
| 2005/0010653 A1 | 1/2005 | McCanne | |
| 2005/0055426 A1 | 3/2005 | Smith et al. | |
| 2005/0071496 A1* | 3/2005 | Singal et al. | 709/232 |
| 2005/0086386 A1 | 4/2005 | Shen et al. | |
| 2005/0102427 A1* | 5/2005 | Yokota et al. | 709/245 |
| 2006/0015637 A1* | 1/2006 | Chung | 709/232 |
| 2006/0026663 A1 | 2/2006 | Kortum et al. | |
| 2006/0126556 A1* | 6/2006 | Jiang et al. | 370/328 |
| 2006/0140180 A1 | 6/2006 | Du Breuil | |
| 2006/0168617 A1* | 7/2006 | Maetz et al. | 725/35 |
| 2006/0282522 A1* | 12/2006 | Lewin et al. | 709/223 |
| 2007/0025327 A1 | 2/2007 | Raciborski et al. | |
| 2007/0043817 A1* | 2/2007 | Oliver et al. | 709/206 |
| 2007/0050517 A1* | 3/2007 | Doi | 709/236 |
| 2007/0061411 A1* | 3/2007 | Laughlin et al. | 709/217 |
| 2007/0083608 A1* | 4/2007 | Baxter et al. | 709/217 |
| 2007/0112973 A1* | 5/2007 | Harris et al. | 709/232 |
| 2007/0118667 A1 | 5/2007 | McCarthy et al. | |
| 2007/0118668 A1 | 5/2007 | McCarthy et al. | |
| 2007/0220118 A1* | 9/2007 | Loyer | 709/219 |
| 2008/0071859 A1 | 3/2008 | Seed et al. | |
| 2008/0072264 A1 | 3/2008 | Crayford | |
| 2008/0092181 A1* | 4/2008 | Britt | 725/87 |
| 2008/0146204 A1* | 6/2008 | Gu et al. | 455/414.1 |
| 2008/0155061 A1 | 6/2008 | Afergan et al. | |
| 2008/0155614 A1* | 6/2008 | Cooper et al. | 725/91 |
| 2008/0215747 A1* | 9/2008 | Menon et al. | 709/231 |
| 2009/0019176 A1 | 1/2009 | Debrosse | |
| 2009/0070533 A1 | 3/2009 | Elazary et al. | |
| 2009/0100459 A1* | 4/2009 | Riedl et al. | 725/35 |
| 2009/0119322 A1* | 5/2009 | Mills et al. | 707/101 |
| 2010/0017600 A1 | 1/2010 | Lepeska et al. | |
| 2010/0023601 A1* | 1/2010 | Lewin et al. | 709/218 |
| 2010/0058405 A1 | 3/2010 | Ramakrishnan et al. | |
| 2010/0077056 A1 | 3/2010 | Kokal et al. | |
| 2010/0235438 A1 | 9/2010 | Narayanan et al. | |
| 2010/0268789 A1 | 10/2010 | Yoo et al. | |
| 2010/0274819 A1 | 10/2010 | Lewin et al. | |
| 2010/0293221 A1* | 11/2010 | Sidman et al. | 709/203 |
| 2010/0312861 A1 | 12/2010 | Kolhi et al. | |
| 2010/0318632 A1* | 12/2010 | Yoo et al. | 709/219 |
| 2010/0325303 A1 | 12/2010 | Wang et al. | |
| 2011/0082924 A1* | 4/2011 | Gopalakrishnan | 709/223 |
| 2011/0082946 A1* | 4/2011 | Gopalakrishnan | 709/231 |
| 2011/0093926 A1* | 4/2011 | Martin et al. | 726/4 |
| 2011/0252100 A1 | 10/2011 | Raciborski et al. | |
| 2012/0041970 A1 | 2/2012 | Ghosh et al. | |
| 2012/0159558 A1 | 6/2012 | Whyte et al. | |
| 2012/0166574 A1 | 6/2012 | Harvell et al. | |
| 2012/0185899 A1* | 7/2012 | Riedl et al. | 725/35 |

FOREIGN PATENT DOCUMENTS

| | | | |
|---|---|---|---|
| KR | 1020030029244 A | | 4/2003 |
| KR | 1020030046817 A | | 6/2003 |
| KR | 10-2003-0068475 A | | 8/2003 |
| WO | 98/57275 A2 | | 12/1998 |
| WO | WO 98/57275 A2 | | 12/1998 |
| WO | WO 2007/111588 A1 | | 10/2007 |
| WO | WO 2007111588 A1 * | | 10/2007 |
| WO | 2011022405 A2 | | 2/2011 |

OTHER PUBLICATIONS

PCT International Search Report and Written Opinion mailed Dec. 28, 2010; International Application No. PCT/US2010/030282; 9 pages.

Wikipedia, "Advanced Message Queuing Protocol", found online on Dec. 14, 2009 at http://en.wikipedia.org/wiki/Advanced_Message_Queuing_Protocol, 8 pages.

Chen, S. et al., SProxy: A caching infrastructure to support internet streaming, IEEE Transactions on Multimedia, Aug. 2007, 9(5):1062-1072.

International Search Report and Written Opinion dated Aug. 30, 2011 for International PCT Application No. PCT/US2010/062142, 8 pages.

Jin, S., et al., "Accelerating Internet Streaming Media Delivery using Network-Aware Partial Caching," Proceeding ICDCS '02 Proceedings of the 22nd International Conference on Distributed Computing Systems, retrieved from http://www.cs.bu.edu/fac/best/res/papers/icdcs02.pdf on May 1, 2012, 2002, 8 pages.

Supplemental Extended Search Report in European Patent Application No. 10861229.2 mailed on Jun. 10, 2014, 44 pages.

Chinese Office Action mailed on Aug. 14, 2013 in Chinese Patent Application No. 200980136159.3, 5 pages.

\* cited by examiner

CONTENT DELIVERY NETWORK STREAM SERVER VIGNETTE DISTRIBUTION

This application claims the benefit of U.S. Provisional Application Ser. No. 61/098,530 filed on Sep. 19, 2008, which is hereby expressly incorporated by reference in its entirety for all purposes.

BACKGROUND

This disclosure relates in general to content delivery networks (CDNs) and, but not by way of limitation, to delivery of content more effectively.

Content delivery networks (CDNs) are used by originators of content to offload delivery of content objects. CDNs distribute edge servers throughout the Internet that host and/or cache content for content originators as a service. Only the largest content originators distribute content objects in an effective manner. A smaller content originator may overload their servers provide poor quality of service (QoS) or worse without reliance on a CDN.

CDNs typically service a large number of end user systems requesting content. If an edge server is assigned a particular delivery, it typically will locate the content object and load it locally as it is delivered. Some of these content objects are especially large. Distribution of large content objects is costly in terms of resources. Often, large content objects are only partially delivered to an end user before the download or stream is terminated or paused.

SUMMARY

In one embodiment, the present disclosure provides a system and method for delivering content objects over the Internet to an end user system with a content delivery network (CDN). The system and method allow for dynamically storing and distributing a portion of content streams. When a content object is requested by an end user media player, the request is assigned to an edge server within the CDN. Characteristics of the content object are used to determine the portion of the content object where the portion is less than all of the requested content. The portion of content object is then retrieved from the content and is stored within the CDN. The portion of requested content is streamed to the end user media player. Ultimately, the whole content is streamed to the end user media player if the remainder of content is requested by the end user media player.

In an embodiment, the present disclosure provide a method for streaming content object over the Internet to an end user system with a CDN, which distributes a vignette of the content object to the end user system. A request to stream a content object to the end user system is received. The request is assigned to an edge server within the CDN. A portion of the content object is determined based, at least in part, on the characteristics of the content object. The portion is less than all of content object. The content object comprises a portion and a remainder. The portion of the content object is retrieved from a remote location. The portion of the content object is stored such that the portion is accessible to the edge server without storing the remainder unless subsequently requested. The portion of the content object is streamed to the end user system.

In another embodiment, the present disclosure provide a CDN for streaming content over the Internet to an end user system, the CDN comprising a content object request function, an edge server selection function, a stream-request function, and a streaming function, etc. The content object request function receives a request for streaming content object to the end user system. The edge server selection function assigns the request to an edge server for streaming content to the end user system. The stream-request function: determines the portion of the content object based, at least in part, on the characteristics of the content object; retrieves the portion of the content object from a remote location; and stores the portion of the content object such that the portion is accessible to the edge server without storing the remainder unless requested. The portion is less than all of content object. The content object comprises a portion and a remainder. The streaming function streams the portion of the content object to the end user system.

In yet another embodiment, the present disclosure provide a method for delivering at least a portion of a content object over the Internet to an end user system with a CDN, which distributes the portion of the content object to the end user system. A request to deliver a content object to the end user system is received. The request is assigned to an edge server within the CDN. A portion of the content object is determined based, at least in part, on the characteristics of the content object. The portion is less than all of content object. The content object comprises a portion and a remainder. The portion of the content object is retrieved from a remote location. The portion of the content object is stored such that the portion is accessible to the edge server without storing the remainder unless subsequently requested. The portion of the content object is delivered to the end user system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may-have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
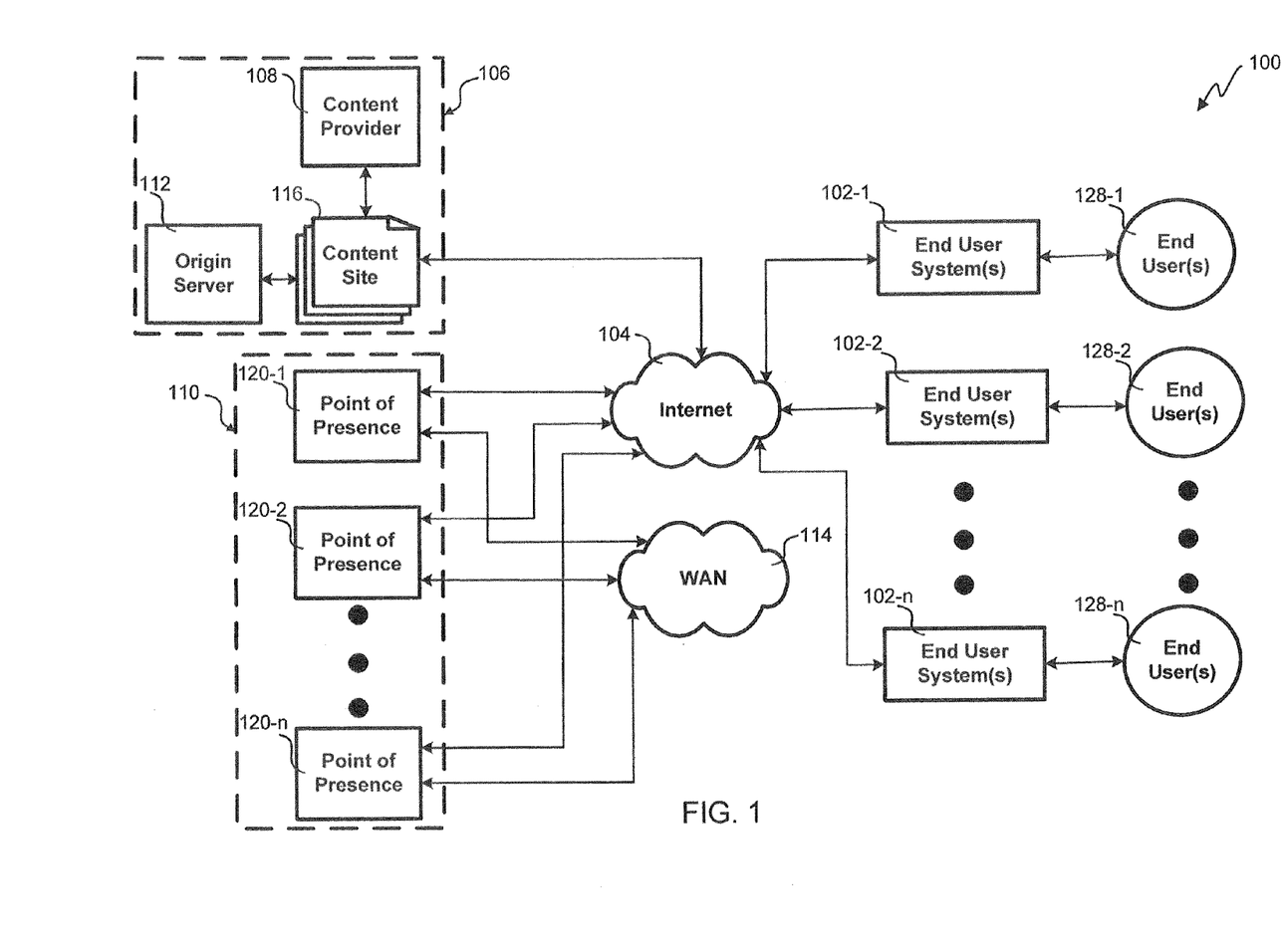
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. The content originator 106 produces and/or distributes content objects and includes a content provider 108, a content site 116, and an origin server 112.

In this embodiment, the content distribution system 100 determines a portion of the content objects and distributes the portion of the content objects to an end user system 102. In this way, the portion of the requested contents are dynamically cached within the CDN 110 to improve the quality of service (QoS) without replicating the whole content object, unless subsequently requested by the end user 128. A content object is any content file or content stream and could include, for example, video, pictures, data, audio, software, and/or text. The content object could be live, delayed or stored. Throughout the specification, references may be made to a content object, content, content stream and/or content file, but it is to be understood that those terms could be used interchangeably wherever they may appear.

Many content providers 108 use a CDN 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 that are proximate to end user systems 102. A wide area network (WAN) 114 or other backbone may couple the POPs 120 with each other and also couple the POPs 120 with other parts of the CDN 110.

When an end user 128 requests a web page through its respective end user system 102, the request for the web page is passed either directly or indirectly via the Internet 104 to the content originator 106. The content originator 106 is the source or re-distributor of content objects. The content site 116 is an Internet web site accessible by the end user system 102. In one embodiment, the content site 116 could be a web site where the content is viewable with a web browser. In other embodiments, the content site 116 could be accessible with application software other than a web browser. The content provider 108 redirects content requests to a CDN 110 after they are made or formulates the delivery path by embedding the delivery path into the URLs for a web page. In any event, the request for content is handed over to the CDN 110 in this embodiment.

Once the request for content object is passed to the CDN 110, it will be associated with a particular POP 120 within the CDN 110. The particular POP 120 may retrieve the portion of the content object from the content provider 108. Alternatively, the content provider 108 may directly provide the content object to the CDN 110 and its associated POPs 120, i.e., in advance of the first request. In this embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

Once the portion of the content object is retrieved, it will be stored within the particular POP 120 and will be served from that POP to the end user system 102. The end user system 102 receives the content object and processes it for the end user 128. The end user system 102 could be a personal computer, media player, handheld computer, Internet appliance, phone, IPTV set top, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments.

Figure 2:
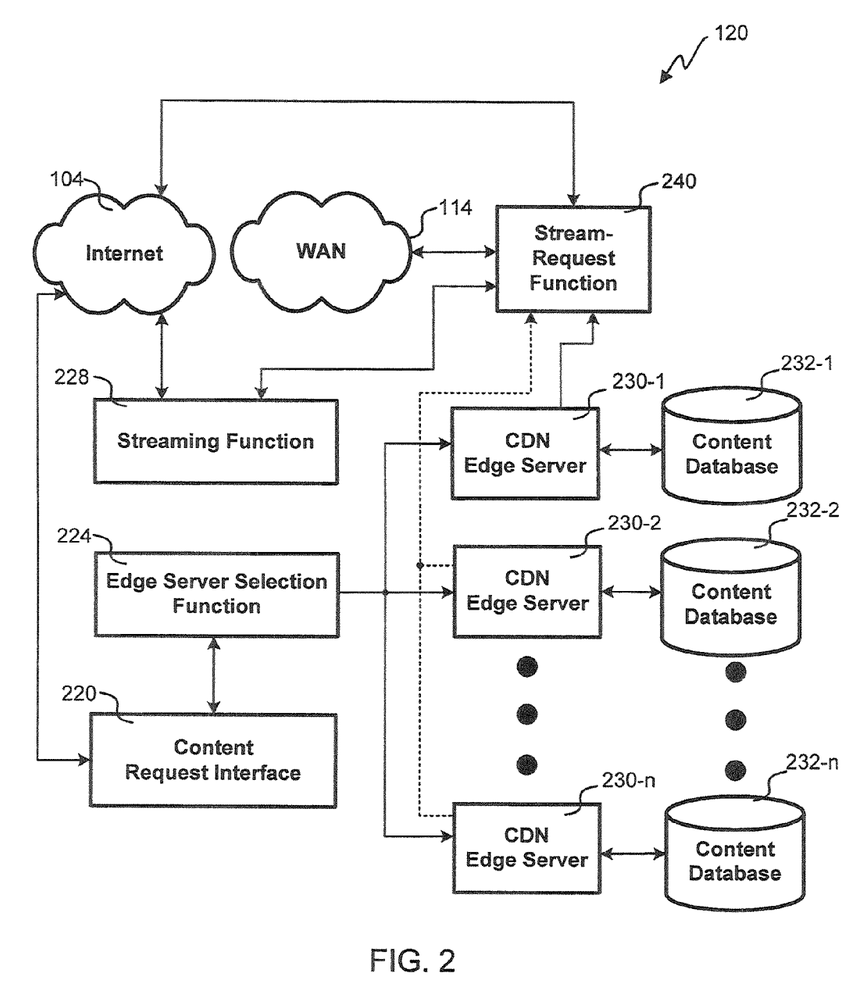
FIG. 2 depicts a block diagram of an embodiment of a point of presence (POP)

Referring next to the FIG. 2, a block diagram of an embodiment of a POP 120 is shown that is one of many within the CDN 110. In this embodiment, the POP 120 may include a content request interface 220, an edge server selection function 224, a number of CDN edge servers 230 and their associated content databases 232, a stream-request function 240, and a streaming function 228. As explained above with respect to the FIG. 1, when a request for content is handed over to the CDN 110, it will be associated with a particular POP 120 within the CDN 110 through any number of algorithms.

The particular POP 120 receives the request for content object through the content request interface 220 and distributes the request to the edge server selection function 224. The edge server selection function 224 assigns the request for content to an edge server 230 to stream the portion of the content object to the end user system 102. The edge server selection function 224 selects the edge server 230 from a group of edge servers 230 in the POP 120. There are a number of mechanisms used by the edge server selection function 224 such as through the domain name service (DNS) resolution, by redirecting the request for a content object or other known mechanisms.

Various parameters may be taken into account by the edge server selection function 224 for choosing of the edge server 230. Examples of parameters influencing selection of a particular edge server may include content object characteristics, servers assignment to a particular content provider, adequate quality of service (QoS), performance metrics, capabilities of the CDN edge server 230, and/or routing efficiency between the edge server 230 and the end user system 102. Embodiments could have any number of edge servers 230 within each POP 120 of the CDN 110. A content database 232 stores content objects or portions thereof along with information that is relevant to the characteristics of the content object. Examples of content object characteristics may include storage space available on the edge server, size of the content object and encoded format of the content object.

Once the request for content is assigned to the selected edge server 230, the content object characteristics from the content database 232, are used to determine a portion of the content object. The stream-request function 240 gathers the content object characteristics and determines the portion of the content to request initially. In this embodiment, the stream-request function 240 is used by a number of edge servers 230, but in other embodiments each edge server 230 could perform the stream-request function 240 for the streams requested from the particular edge server 230.

As will be described further below in various embodiments, the step of determining the portion of the content object to cache initially is performed by the stream-request function 240, which may use various algorithms. After determining the portion of the requested content, the stream-request function 240 retrieves the portion of the content object from a remote location if not stored already in one of the content databases 232. The remote location may be an origin server 112 or another CDN server in the same or different POP 120. The portion of the requested content is then stored on the content database 232 such that the stored portion of the content object is accessible to the selected edge server 230.

The streaming function 228 streams the portion of the requested content to the end user system 102. In this embodiment, the streaming function 228 is shared by a number of edge servers 230, but in other embodiments, each edge server 230 includes its own streaming function 228. The streaming function 228, stream-request function 240, edge server selection function 224, and content request interface 220 could be implemented in one or more servers, network appliances and/or switches.

Figure 3A:
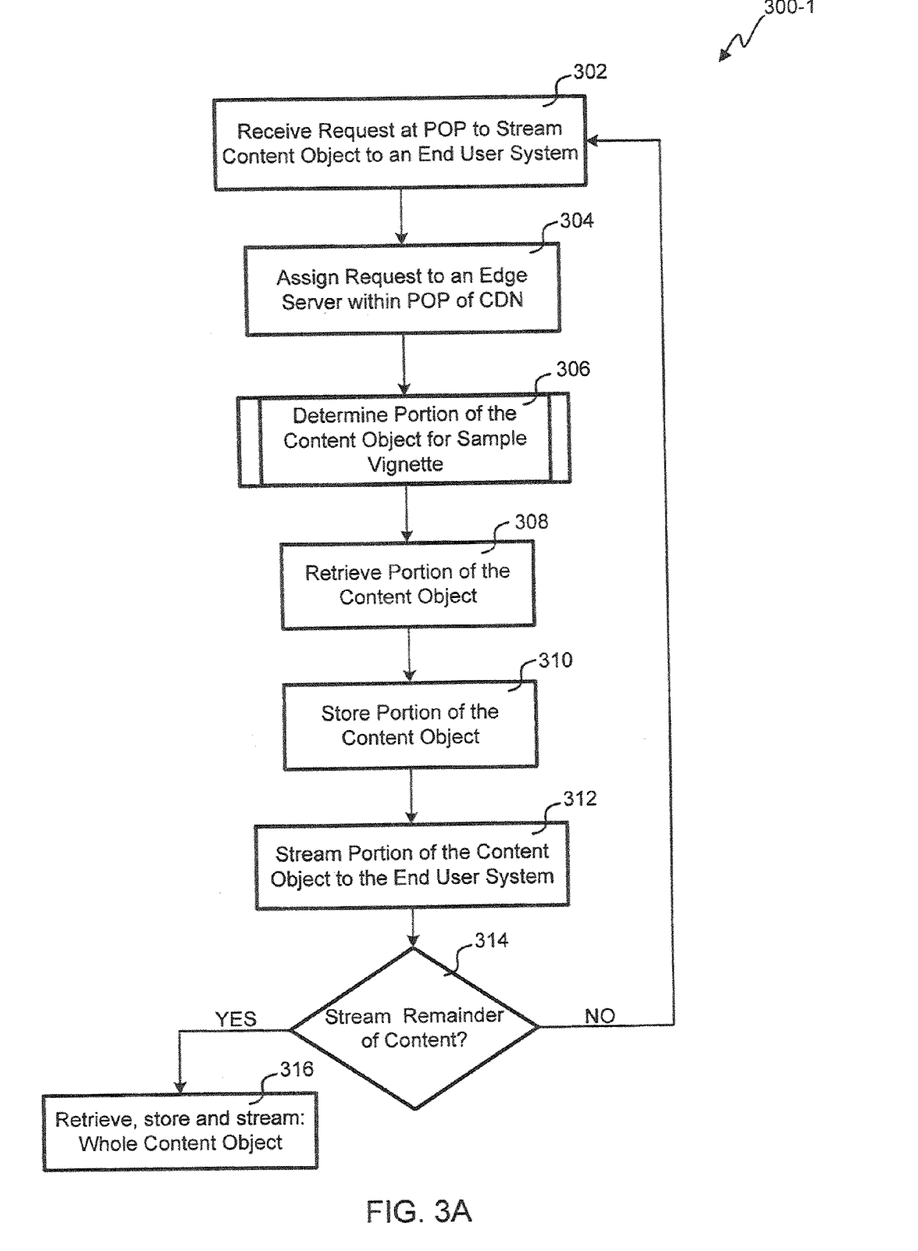
FIGS. 3A, 3B and 3C illustrate flowcharts of embodiments of a process for delivering a vignette of a content object over the Internet to an end user system with a content delivery network (CDN)

Referring next to FIG. 3A, an embodiment of a process 300-1 for delivering a vignette of the content object over the Internet 104 to an end user system 102 with a CDN 110 is shown. The depicted portion of the process 300-1 begins in block 302 where a user request for content is received at a particular POP 120 to stream the content to an end user system 102. The edge server selection function 224 is then used at block 304 to assign the request to an edge server 230 of the POP 120. The edge server selection function 224 may use domain name system (DNS) resolutions or an HTTP redirects to direct a particular end user system 102 to a particular edge server 230.

Once the request is assigned to the edge server 230, processing continues to block 306 where the stream-request function 240 determines a portion or vignette from the content object for a sample vignette. The sample vignette may be a video or audio clip in some embodiments. In one embodiment, the portion of the requested content may have a fixed length that are retrieved from different parts of the content object. In an alternative embodiment, the portion of the content object may vary in length. This embodiment determines the length of the portion according to the statistics information, which is tracked over time to provide an estimate of the length of the portion. In yet another embodiment, the portion of the content object may include a number of portions from the content object. Other embodiments may determine the portion of the content object based upon a determination of what size will provide an adequate quality of service (QoS) during download.

After determining the portion of the requested content to cache in the content database 232, the stream-request function 240 retrieves the portion of the content object at block 308. In one embodiment, the portion of the content object may be retrieved from an origin server 112. Other embodiments may retrieve the portion of the content from another CDN server in the same or a different POP 120. Once the portion of the content object is retrieved, processing continues to block 310 where the stream-request function 240 stores the portion of the requested content in the content database 232 and updates other information in the content database 232. The stored portion of the content is accessible to the edge server 230 and other edge servers 230 distributed throughout the CDN 110. The processing then goes to block 312 where the streaming function 228 streams the portion of the requested content to the end user system 102 that requested the portion back in block 302.

A determination is made, at block 314 as to whether the remainder of the content is subsequently requested by the end user 128. If the remainder of the content is requested, processing flows from block 314 to block 316 where the stream-request function 240 retrieves and stores the whole content object or more of the content object while the streaming function 228 streams the requested content to the end user system 102. The request for more of the content object could be implicit, for example, the end user 128 could watch the content object beyond the portion. If the remainder of the content is not requested, processing goes back to block 302 for receiving the next request.

Figure 3B:
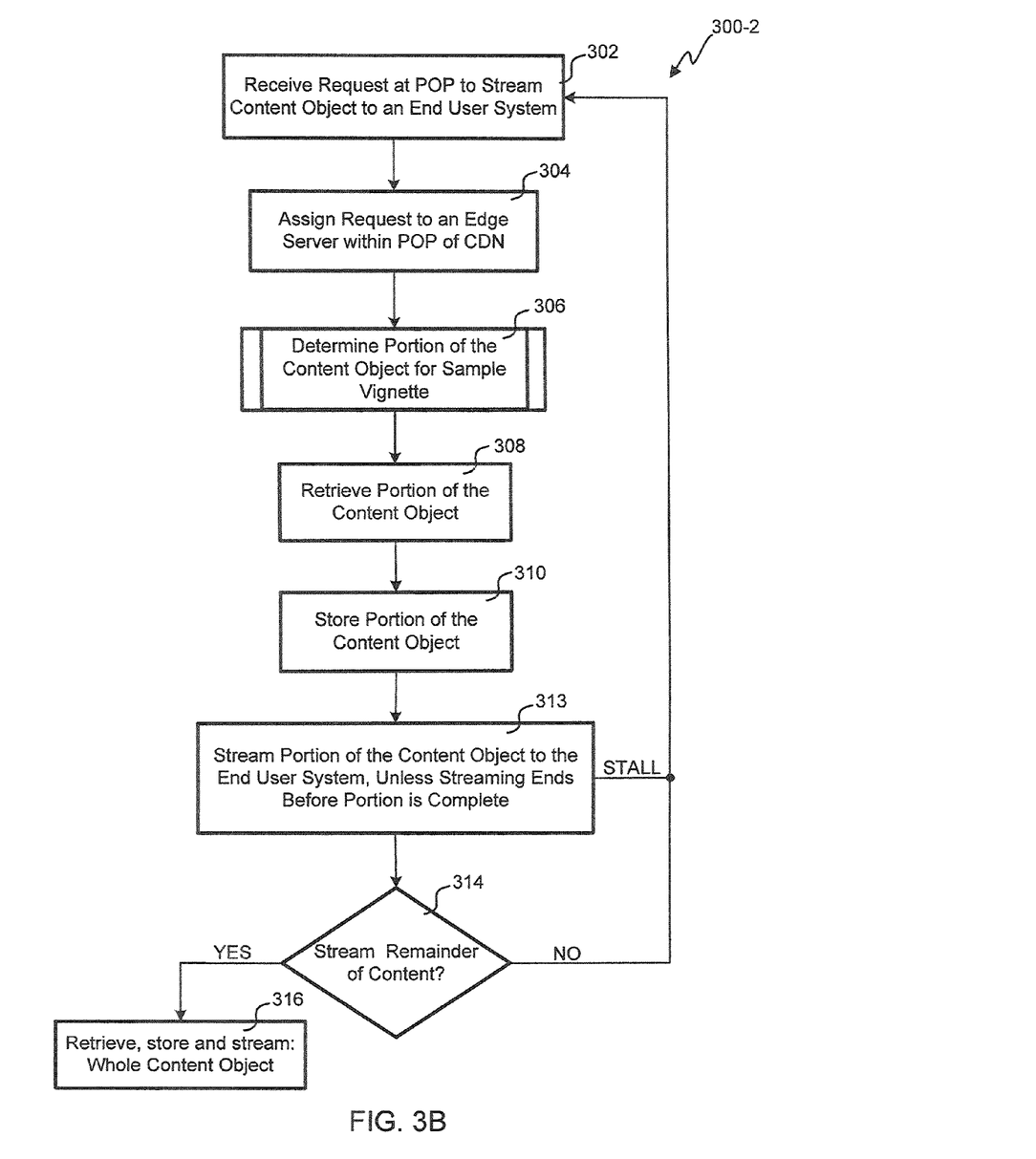

Referring next to FIG. 3B, another embodiment of a process 300-2 for delivering a vignette of the content object over the Internet 104 to an end user system 102 with a CDN 110 is shown. The depicted portion of the process 300-2 differs from the embodiment of FIG. 3A in that block 312 is replaced by block 313, among other things. In block 313, streaming of the portion begins coextensive in time with obtaining the portion. Typically, the portion is retrieved quicker than the streaming would play out. Often, streaming of the portion halts before the portion is loaded on the edge server. Streaming may stop because the end user lost interest or that the viewer switched to a different bit rate that would have its own portion. In those cases, this embodiment stalls fetching the portion and return to block 302.

Some embodiments could only stall the fetch of the portion in some circumstances. A determination could be made as to whether the portion is likely to be requested by another in the near term. Popularity could be used to anticipate future requests or other factors could be used in the prediction. If future requests are anticipated, the portion could be completely fetched regardless of whether the stream stopped to a particular end user. On the other hand, for a portion unlikely to be used, a stall would stop fetching the portion.

Figure 3C:
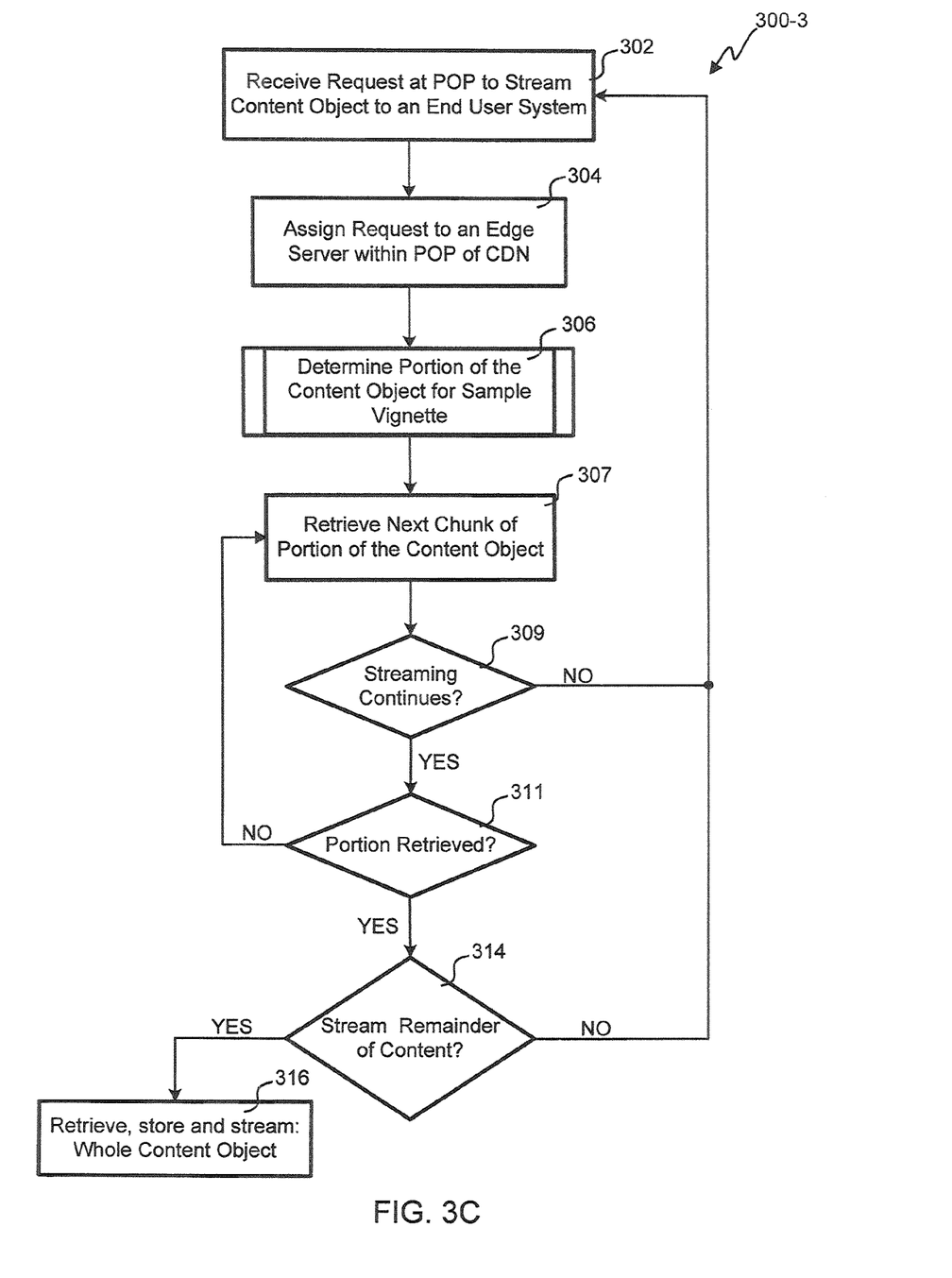

Referring next to FIG. 3C, still another embodiment of a process 300-3 for delivering a vignette of the content object over the Internet 104 to an end user system 102 with a CDN 110 is shown. The depicted portion of the process 300-3 differs from the embodiment of FIG. 3A in that blocks 308, 310 and 312 are replaced by blocks 307, 309 and 311, among other things. In block 307, a chunk or fraction of the portion is retrieved. The chunk is large enough to allow streaming without stalling so is chosen with the bitrate in mind. An additional buffering on the chunk further reduces the chance of stalling for boundary conditions.

In block 309, it is determined if streaming continues or if the end user stalled in the playback or switched to a different bitrate, for example. Where requests for the stream stop, processing goes from block 309 to block 302. Where streaming continues processing goes from block 309 to 311 to determine if the entire portion is received. Upon receipt of the entire portion, processing continues to block 314. Where more of the portion is missing, processing loops back to block 307 to obtain the next chunk.

Figure 4:
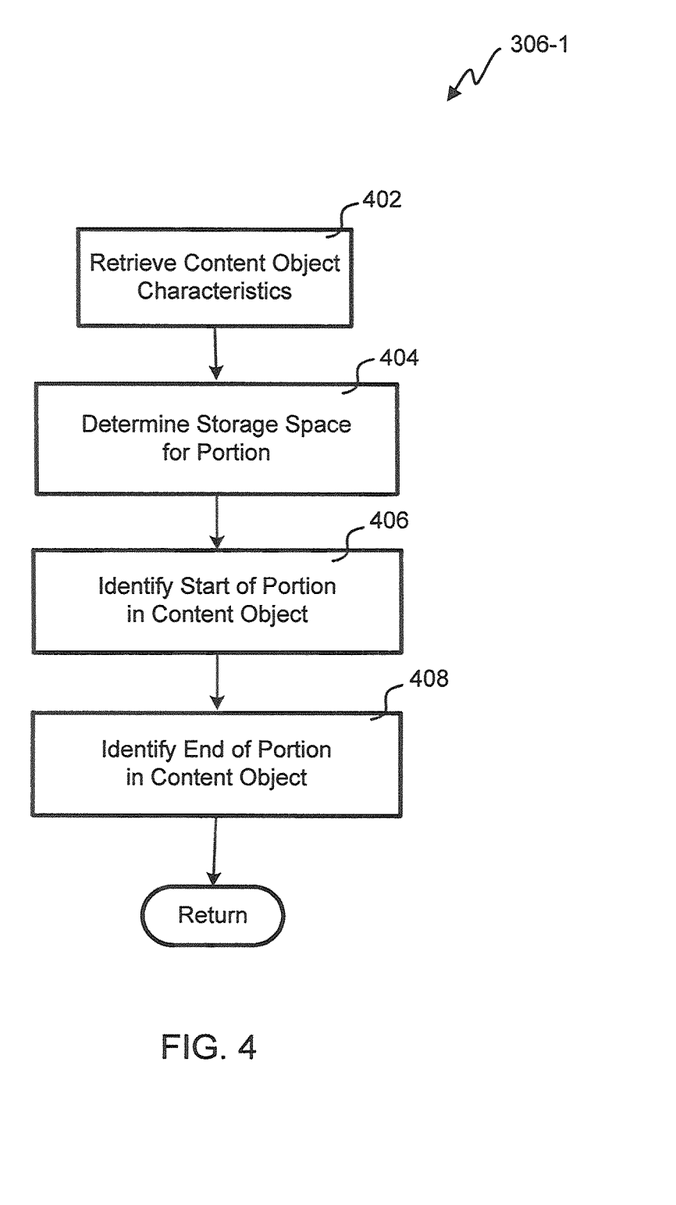
FIGS. 4, 5, 6, and 7 illustrate flowcharts of embodiments of a process for determining a portion or vignette of requested content.

With reference to FIG. 4, a flow diagram of an embodiment of a process 306-1 for determining a portion of the requested content is shown. The depicted portion of the process begins in step 402 where the stream-request function 240 retrieves information relevant to the content object characteristics from the content database 232. Once the content characteristics are retrieved, processing continues to block 404 where the stream-request function 240 determines the storage space for a portion of the content object. In this embodiment, the portion is of a predetermined time length. An example of a time length for the portion is two minutes of the content object. Other embodiments could use any size portion, for example, 1, 2, 5, 10, 15, or 20 minutes.

Once the storage space for the portion is determined, the process continues to block 406 where the start of portion in the requested content object is identified. The stream-request function 240 is used to identify the start of the portion of the content object. The start of the portion coincides with the start of the content object in this embodiment. However, the start of the portion may occur anywhere within the content object in various embodiments.

Different methods and algorithms are used to identify the start portion within the content in block 406. In some embodiments, the content object is playback time encoded within the content object to allow determining the start of the portion by analysis of the playback time at various times throughout the content object. In an alternative embodiment, the start portion may be identified by decoding the encoded content up until the start of the portion. After identifying the start portion, processing flows to block 408 where the end of portion is identified using start of the portion location and moving the time length to find the end of the portion.

Figure 5:
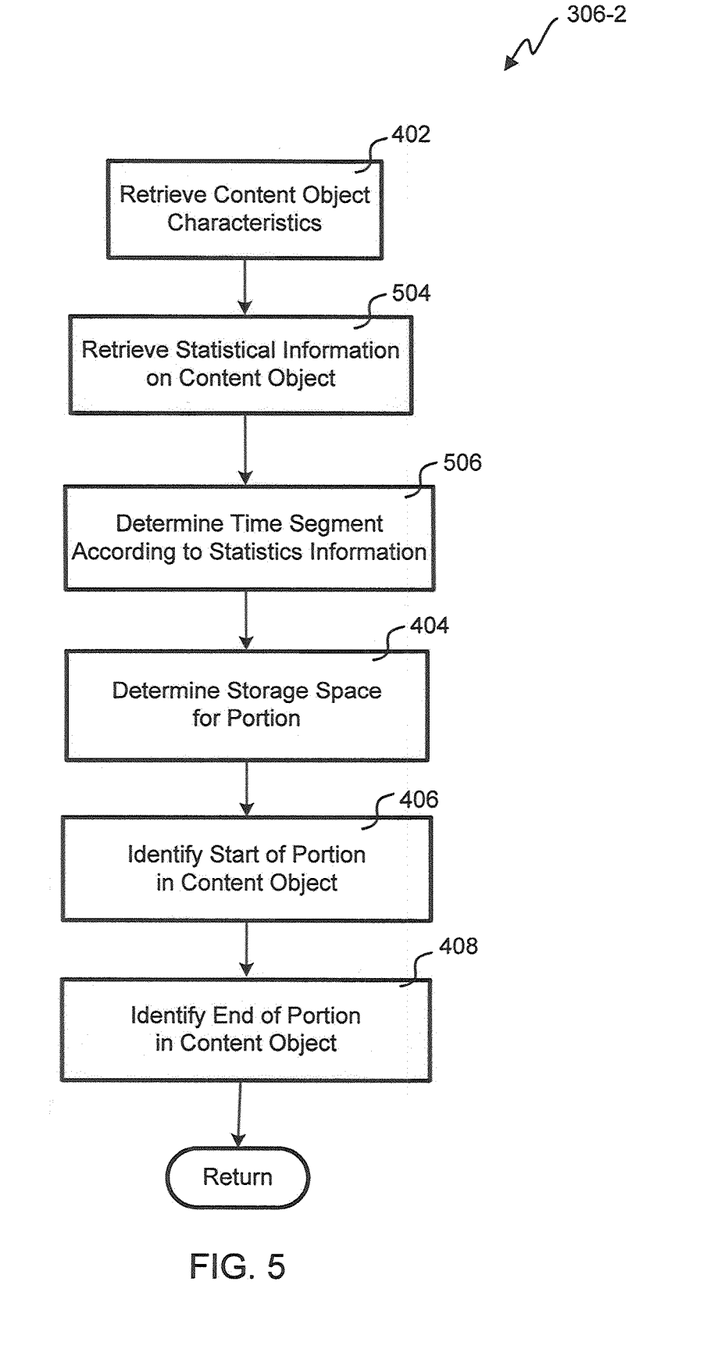

Referring next to FIG. 5, a flow diagram of another embodiment of a process 306-2 for determining a portion of the requested content is shown. In this embodiment, historical trends and user's preferences are tracked and stored over time such that statistical information may be derived and used for future determinations. This embodiment differs from that of FIG. 4 in that new blocks 504 and 506 are inserted between blocks 402 and 404. At block 504 the stream-request function 240 retrieves statistical information from content database 232 in addition to the characteristics of the content. At block 506, the stream-request function 240 determines an appropriate time segment according to the statistics information. In this embodiment, the portion of the content object is determined dynamically according to statistics information such that the appropriate time segment varies in length for each requested content object. For example, the statistical information may indicate that a portion from the third and fifth minute of the content object are viewed most often. That portion would be requested by, whenever the content object is requested.

Figure 6:
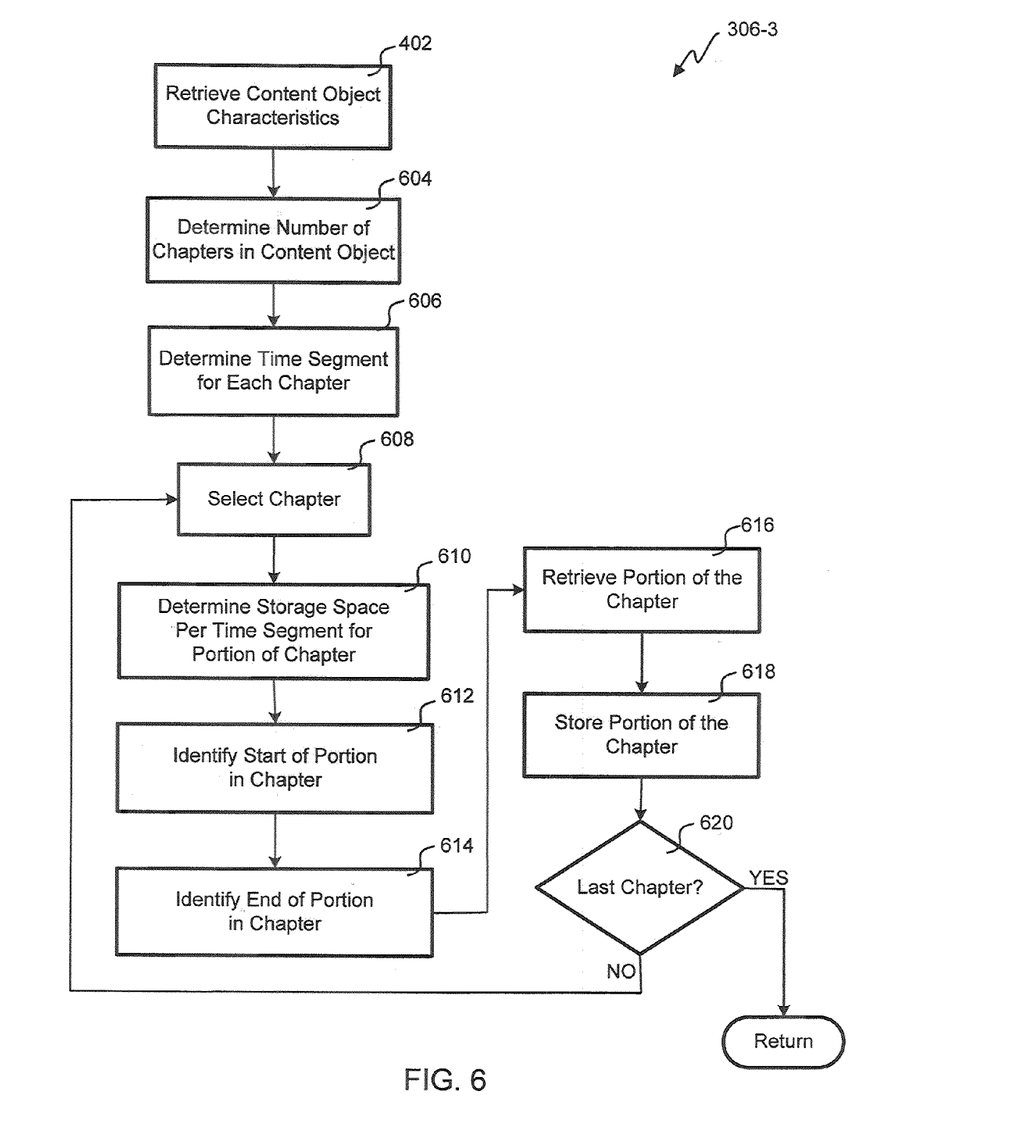

With reference to FIG. 6, a flow diagram of yet another embodiment of process 306-3 for determining a portion(s) of the requested content object is shown. In this embodiment, the requested content object includes a number of portions corresponding to chapter in a video. The depicted portion of the process begins in block 402 where the stream-request function 240 retrieves content object characteristics from the content database 232.

Once the characteristics of the content object are retrieved, processing continues to block 604 where the stream-request function 240 determines the number of chapters in the requested content. In this embodiment, a separate control stream or metadata is provided for the content object such that the CDN 110 determines the timing information necessary to know when one chapter ends and another begins. Although chapters are one way to define the different portions that could be gathered for a content object, there are other ways to define the portions such as a small clip every ten minutes or some other time increment.

The time segment for each chapter is then determined at block 606 and the processing flows to block 608 where the stream-request function 240 selects the first chapter. This embodiment determines the storage space per time segment and identifies the start and end portion of the content for each chapter at blocks 610, 612 and 614. The portion of the content object, for each chapter, is then retrieved and stored at blocks 616 and 618.

A determination is made, at block 620 as to whether the last chapter of the content is reached or selected. If the last chapter is not reached, processing flows from block 620 to block 608 where the next chapter in the content is available for selection. The processing then continues through the blocks 610-620 until the last chapter is reached or selected. If the last chapter is reached, processing ends for the content object. Although this embodiment gathers all the portions up front, other embodiments could gather the various portions as playback or trick-play gets close to the portion.

Figure 7:
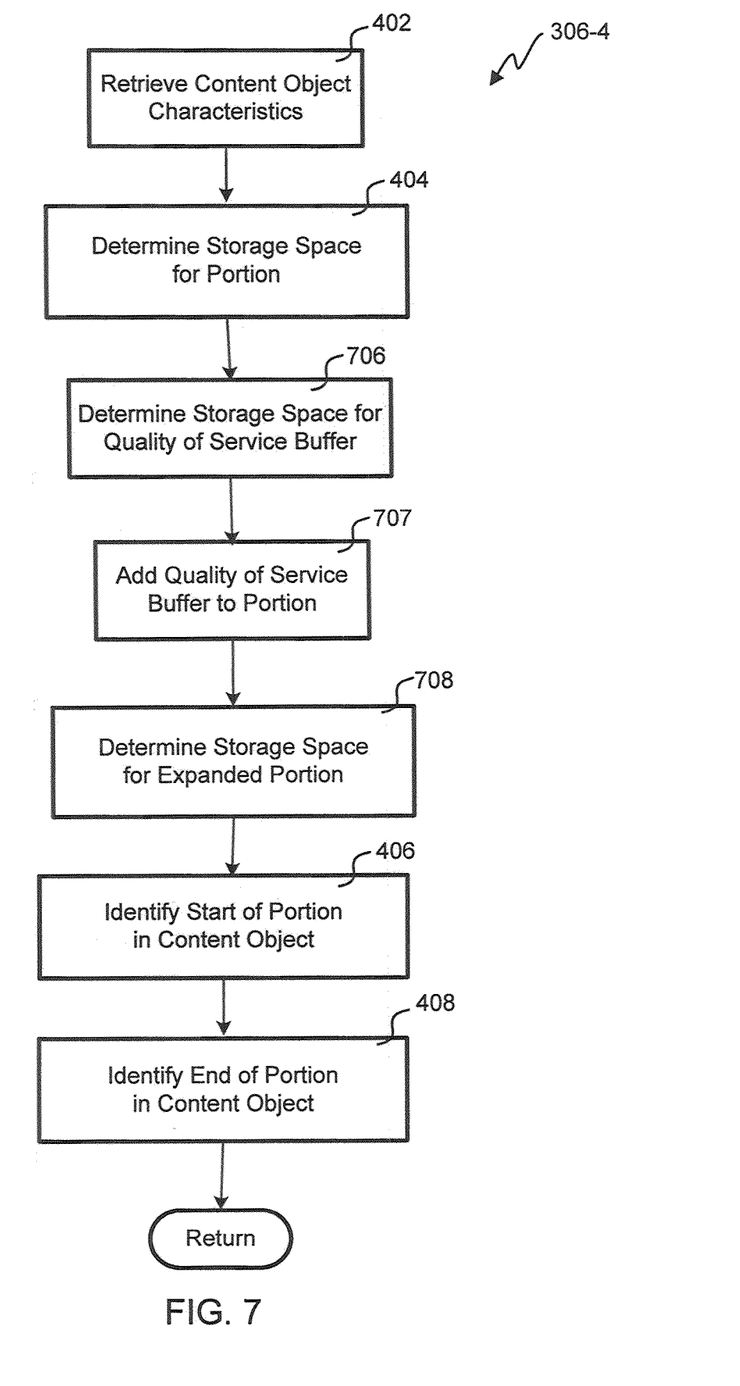

Referring next to FIG. 7, a flow diagram of another embodiment of a process 306-4 for determining a portion of the requested content object is shown. In this embodiment, a quality of service (QoS) buffer is provided such that content object is played back at the user system 102 without any interruption if the end user 128 decides to request the whole content object. Both the portion and the QoS buffer are contiguous in time such that the portion is expanded to include the QoS buffer. This embodiment is similar to the embodiment of FIG. 4 by adding blocks 706, 707 and 708 between blocks 404 and 406. After retrieving the content object characteristics at block 402, the storage space or size of the portion is determined at block 404. Some embodiments may have a predetermined value for the portion. Other embodiments may dynamically determine the time segment according to some statistics gathered over time for each requested content object.

In this embodiment, the QoS buffer time is determined in block 706. The time or size of the QoS buffer is determined based, at least in part, on the time consumed streaming the whole content according to the characteristics of the requested content versus the speed of the network connection. Once the QoS buffer is determined, processing continues to block 707 where the QoS buffer is added to the portion to extend the end point of the expanded portion. Processing flows to block 708 where the storage space or length is determined for the expanded portion. The start and end of the expanded portion are respectively identified at blocks 406 and 408.

Some embodiments could determine how likely the content object will be requested by others. If the content is unlikely to be requested ever again, the portion could be smaller than if the content is likely to be requested soon thereafter. A popularity metric could be maintained by the CDN and/or content originator that would be one factor in determining the size of the portion.

In some embodiments, the size of the content object is small. It may be that the playback length is small and/or that the bitrate is small. In any event, smaller content objects do not heavily tax the CDN. In those embodiments, content objects below a certain threshold in size could forgo the process of determining a portion for placement in the edge server before needed. Since not resource intensive, the smaller content objects would be handled in a traditional manner.

A number of variations and modifications of the disclosed embodiments can also be used. For example, some of the above embodiments calculate the vignette size by playback times, but other embodiments could choose a portion of the content object by its size. For example, the first byte, 5 MB, 10 MB or 20 MB could be stored. Some embodiments could make the vignette sticky in a cache of the edge server or otherwise prevent the vignette from purging normally from the cache. Later requests for the content object would have the vignette immediately available by avoiding purge from the cache.

The amount to initially store could be derived by estimating the maximum storage that would be necessary to store a particular time segment. For example, at the maximum bitrate for content objects for a particular content originator, 10 MB may always be able to store the first two minutes. To simplify things, the first 10 MB could be stored upon request rather than determining particular time values.

While the principles of the disclosure have been described above in connection with specific apparatuses and methods, it is to be clearly understood that this description is made only by way of example and not as limitation on the scope of the disclosure.

What is claimed is:

1. A method for streaming a content object over the Internet to an end user system with a content delivery network (CDN), which distributes a vignette of the content object to the end user system, the method comprising:
   receiving a URL request to stream the content object to the end user system;
   assigning the URL request to an edge server within the CDN;
   subsequent to receiving the URL request, determining a portion of the content object based, at least in part, on characteristics of the content object, wherein:
      the determining the portion of the content object is performed in the application layer,
      the characteristics of the content object comprises at least one of storage space required, size of the content object or encoding format of the content object,
      the portion is less than all of the content object, and
      the content object comprises the portion and a remainder;
   retrieving the portion of the content object from a remote location;
   storing the portion of the content object away from the remote location without storing the remainder unless subsequently requested;
   accessing the portion by the edge server;
   streaming the portion of the content object from the edge server to the end user system; and
   delaying a request to retrieve the remainder of the content object for loading on the edge server until after streaming the portion of the content object to the end user system, wherein:
      delaying the request to retrieve the remainder of the content object is performed in the application layer; and
      the edge server avoids loading the remainder of the content object should streaming the portion to the end user system cease during playback of the portion.

2. The method for streaming the content object over the Internet to the end user system with the CDN, which distributes a vignette of the content object to the end user system as recited in claim 1, wherein the determining comprises:
   retrieving content object characteristics;
   determining storage space per time segment based, at least in part, on the content object characteristics;
   identifying start of the portion in the content object; and
   identifying end of the portion in the content object.

3. The method for streaming the content object over the Internet to the end user system with the CDN, which distributes a vignette of the content object to the end user system as recited in claim 1, wherein the vignette comprises an audio or video clip.

4. The method for streaming the content object over the Internet to the end user system with the a CDN, which distributes a vignette of the content object to the end user system as recited in claim 1, wherein the assigning is performed through a domain name system (DNS) resolution.

5. The method for streaming the content object over the Internet to the end user system with the CDN, which distributes a vignette of the content object to the end user system as recited in claim 1, wherein the assigning is performed through an HTTP Redirect function.

6. The method for streaming the content object over the Internet to the end user system with the CDN, which distributes a vignette of the content object to the end user system as recited in claim 1, wherein the content object comprises an on-demand stream.

7. The method for streaming the content object over the Internet to the end user system with the CDN, which distributes a vignette of the content object to the end user system as recited in claim 1, wherein the portion of the content object comprises a predetermined period of an on-demand stream.

8. The method for streaming the content object over the Internet to the end user system with the CDN, which distributes a vignette of the content object to the end user system as recited in claim 7, wherein the predetermined period starts at a beginning of the on-demand stream.

9. The method for streaming the content object over the Internet to the end user system with the CDN, which distributes a vignette of the content object to the end user system as recited in claim 1, wherein the remote location comprises an origin server.

10. The method for streaming the content object over the Internet to the end user system with the CDN, which distributes a vignette of the content object to the end user system as recited in claim 1, wherein the remote location comprises another edge server within the CDN.

11. A content delivery network (CDN) for streaming a content object over the Internet to an end user system, the CDN comprising:
   a content object request function that receives a URL request for streaming the content object to the end user system;
   an edge server selection function that assigns the URL request to an edge server for streaming content to the end user system;
   a stream-request function, wherein the stream-request function:
      subsequent to the content object request function receiving the URL request, determines the portion of the content object based, at least in part, on characteristics of the content object, wherein:
         the determining the portion of the content object is performed in the application layer,
         the characteristics of content object comprises at least one of storage space required, size of the content object or encoding format of the content object,
         the portion is less than all of the content object, and
         the content object comprises the portion and a remainder;
      retrieves the portion of the content object from a remote location;
      stores the portion of the content object away from the remote location without storing the remainder unless requested after the portion of the content object is streamed to the end user system;
      accesses the portion by the edge server;
      delays a request to retrieve the remainder of the content object, wherein delay of the request to retrieve the remainder of the content object is performed in the application layer; and
      upon receiving a second request, retrieves the remainder of the content object from the remote location, wherein the edge server avoids loading the remainder of the content object should streaming the portion to the end user system cease during playback of the portion; and
   a streaming function that streams the portion of the content object from the edge server to the end user system.

12. The CDN for streaming the content object over the Internet to the end user system as recited in claim 11, wherein the portion is a first byte of the content object.

13. The CDN for streaming the content object over the Internet to the end user system as recited in claim 11, wherein the portion is made sticky in a cache of the edge server to avoid automatic purging from the cache.

14. The CDN for streaming the content object over the Internet to the end user system as recited in claim 11, wherein the remote location is an origin server for the content.

15. A method for delivering at least a portion of a content object over the Internet to an end user system with a content delivery network (CDN), which distributes the portion of the content object to the end user system, the method comprising:
  receiving a URL request to deliver the content object to the end user system;
  assigning the URL request to an edge server within the CDN;
  subsequent to receiving the URL request, determining a portion of the content object based, at least in part, on characteristics of the content object, wherein:
    the determining the portion of the content object is performed in the application layer,
    the characteristics of content object comprises at least one of storage space required, size of the content object or encoding format of the content object,
    the portion is less than all of the content object, and
    the content object comprises the portion and a remainder;
  retrieving the portion of the content object from a remote location;
  storing the portion of the content object away from the remote location without storing the remainder unless subsequently requested after the portion of the content object is streamed to the end user system;
  accessing the portion by the edge server;
  delivering the portion of the content object from the edge server to the end user system; and
  delaying a request to retrieve the remainder of the content object, wherein:
    delaying the request to retrieve the remainder of the content object is performed in the application layer; and
    the edge server avoids loading the remainder of the content object should delivery of the portion to the end user system cease during playback of the portion.

16. The method for delivering at least the portion of the content object over the Internet to the end user system with the CDN as recited in claim 15, wherein the delivery of the portion is streaming delivery.

17. The method for delivering at least the portion of the content object over the Internet to the end user system with the CDN as recited in claim 15, further comprising:
  determining that the end user system is no longer receiving the delivery of the portion, and
  halting retrieval of whatever is still missing from the portion when the end user is no longer receiving delivery.

18. The method for delivering at least the portion of the content object over the Internet to the end user system with the CDN as recited in claim 15, further comprising:
  determining that the end user system is no longer receiving the delivery of the portion,
  determining if the portion is likely to be requested by others within a time frame, and
halting retrieval of whatever is still missing from the portion when the end user is no longer receiving delivery if the portion is unlikely to be requested again.

19. The method for delivering at least the portion of the content object over the Internet to the end user system with the CDN as recited in claim 15, further comprising determining if a size of the content object is below a threshold or is a bitrate below a threshold and forgoing performance of at least the determining a portion.

* * * * *